(No Model.)
R. F. SCHROEDER.
WATER PURIFIER AND OIL EXTRACTOR FOR ICE MACHINES.
No. 549,295. Patented Nov. 5, 1895.
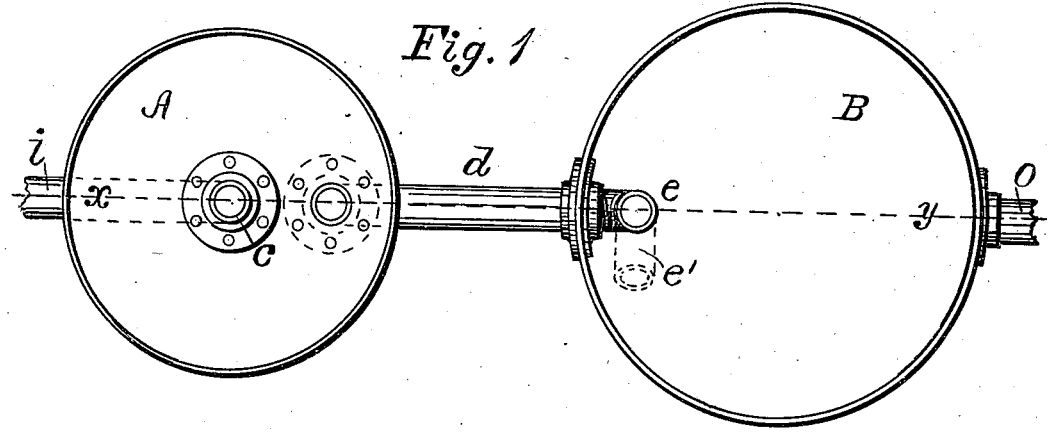
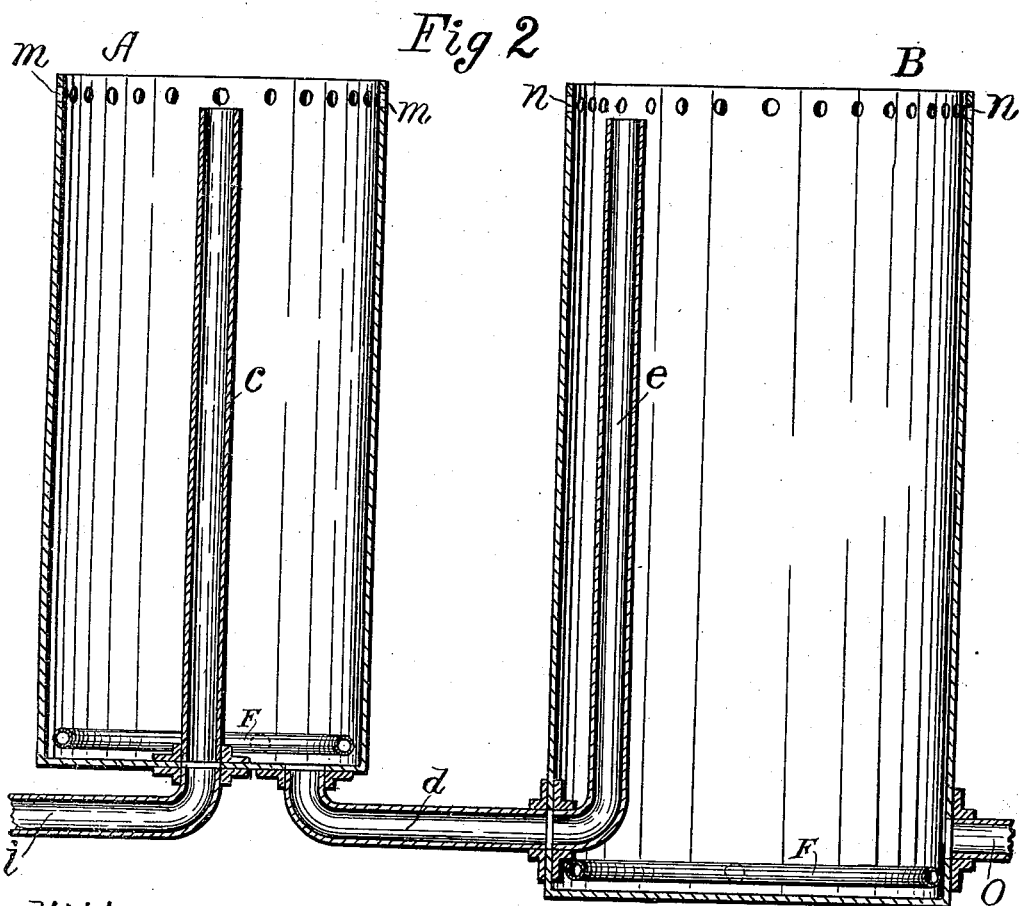
Witnesses
Inventor
Richard F. Schroeder
By Dewey & Co.
Attys

UNITED STATES PATENT OFFICE.

RICHARD FRANKLIN SCHROEDER, OF SACRAMENTO, CALIFORNIA.

WATER-PURIFIER AND OIL-EXTRACTOR FOR ICE-MACHINES.

SPECIFICATION forming part of Letters Patent No. 549,295, dated November 5, 1895.

Application filed April 5, 1895. Serial No. 544,649. (No model.)

*To all whom it may concern:*

Be it known that I, RICHARD FRANKLIN SCHROEDER, a citizen of the United States, residing at Sacramento, county of Sacramento, State of California, have invented an Improvement in Water-Purifiers and Oil-Extractors for Ice-Machines; and I hereby declare the following to be a full, clear, and exact description of the same.

My invention relates to an apparatus for purifying water to be used in ice-machines, and especially for extracting the oil from the water produced by the condensation of the exhaust-steam from the engines, so that this water can be afterward employed in the manufacture of ice.

It consists in certain details of construction, which will be more fully explained by reference to the accompanying drawings, in which—

Figure 1 is a plan view of my apparatus. Fig. 2 is a vertical section taken through $xy$ of Fig. 1.

The water which is derived from the condensation of the exhaust-steam from engines is always more or less charged with the oil used for lubrication and which escapes with the exhaust-steam. This water is otherwise sufficiently pure to be used in the manufacture of ice, and my invention is designed to free it from the oil and prepare it for such use.

A and B are two cylinders closed at the bottom and having perforations $m$ and $n$, respectively, around the upper periphery.

$i$ is a pipe leading from the condenser and connecting with a pipe $c$, which extends vertically up through the vessel A to a point near the top. Water being introduced through this pipe, fills the vessel A to about the level of the holes or perforations $m$, and any oil which is carried by the water will rise to the surface of the vessel A, and will flow over and out through the apertures $m$.

$d$ is a pipe connecting with the bottom of the chamber or vessel A, leading through the side or bottom of the vessel B and connecting with the upturned vertical pipe $e$, which also extends to near the top of the vessel B. Through this pipe water flows from the bottom of the vessel A and fills the vessel B, and when filled any remaining oil or light substance in the water will overflow from the surface through the openings $n$.

O is a pipe leading from the vessel B to the filter, (not here shown,) into which the water is delivered preparatory to passing to the freezing apparatus.

By means of the apparatus here shown I allow the water to enter the vessel A and become approximately quiet therein after it is once filled and so that most if not all of the oil and lighter substances will rise to the surface and will continuously flow off through the openings $m$. If, however, any small quantity of oil still remains in the water and should be carried through the pipe $d\,e$ into the chamber B, the latter being of larger diameter, allows a considerable quantity of water to be stored up therein in a norrmally quiescent state, so that any oil which may remain in it will be discharged through the openings $n$ and the water will be purified sufficiently for future use.

Either or both the chambers A and B are provided with heating-coils F, whereby the water is heated or reboiled to expel any air which may have been absorbed, and this heating also assists in raising the oil to the surface and causing it to separate from the water and overflow.

The supply pipe or pipes may be made to tilt from side to side, as shown in dotted lines at $e'$, so as to vary the height of the pipe with relation to the overflow passages. The pipe $e$ being adapted to be tilted from side to side to regulate its height with reference to the overflow, it is obvious that when said pipe stands vertical it insures the discharge of the greater portion of the oil through the apertures in the tank A, and after this is done, or at any time during the process, the discharge is regulated to any desired degree by tilting the pipe $e$, as shown by the dotted lines $e'$.

Having thus described my invention, what I claim as new, and desire to secure by Letters Patent, is—

1. A device for purifying water and separating oil therefrom, consisting of a plurality of chambers or vessels each of which is provided with a series of overflow perforations formed in its walls just below the upper edge, a supply pipe leading into the lower portion of the initial chamber or vessel, and having an upwardly extending overflow pipe terminating at its upper end near the line of overflow perforations therein, a pipe from the initial chamber or vessel leading into the next chamber or vessel, and terminating at its upper end contiguous to the overflow perforations therein, and a heating coil in said vessels adapted to reheat the water to expel the absorbed air and assist in raising the oil to the surface, and a discharge from the second chamber or vessel for the purified water.

2. A device for purifying water and separating oil therefrom, consisting of one or more chambers or vessels, a supply pipe entering the bottom of the first chamber, extending to near the top whereby the vessel is kept full by overflow therefrom, a series of perforations around the upper periphery of the vessel approximately on a level with the discharge end of the pipe for the escape of oil, a second pipe leading from the bottom of said vessel and extending upwardly to near the top of the second vessel whereby the latter is in like manner filled by overflow from the pipe, a series of perforations or openings around the upper periphery of said vessel whereby the overflow from the surface of the water therein may take place, and a delivery pipe opening from the bottom of the vessel.

3. The combination, of a plurality of chambers or vessels each provided with an overflow formed in its walls just below the upper edge, a supply pipe entering the bottom of the initial vessel, extending upwardly and terminating, at its upper end, near the line of overflow, a pipe leading from the bottom of the initial chamber or vessel, through the lower side of the second chamber or vessel and extending upwardly within said second chamber or vessel to a point near the overflow thereof, means within the vessels for reheating the water and expelling the absorbed air, and assisting in raising the oil to the surface, and a discharge from the lower portion of the second chamber or vessel for the purified water.

In witness whereof I have hereunto set my hand.

RICHARD FRANKLIN SCHROEDER.

Witnesses:
J. W. HUGHES,
CLINTON L. WHITE.